(12) United States Patent
Moon et al.

(10) Patent No.: US 11,947,114 B2
(45) Date of Patent: Apr. 2, 2024

(54) HOLOGRAPHIC LENS AND APPARATUS INCLUDING THE SAME

(71) Applicant: SAMSUNG ELECTRONICS CO., LTD., Suwon-si (KR)

(72) Inventors: Seokil Moon, Suwon-si (KR); Changkun Lee, Seoul (KR); Geeyoung Sung, Daegu (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 363 days.

(21) Appl. No.: 17/338,970

(22) Filed: Jun. 4, 2021

(65) Prior Publication Data

US 2022/0171189 A1 Jun. 2, 2022

(30) Foreign Application Priority Data

Dec. 2, 2020 (KR) .................. 10-2020-0166941

(51) Int. Cl.
*G02B 27/01* (2006.01)
*G02B 5/32* (2006.01)

(52) U.S. Cl.
CPC ........... *G02B 27/0172* (2013.01); *G02B 5/32* (2013.01); *G02B 2027/0174* (2013.01); *G02B 2027/0178* (2013.01)

(58) Field of Classification Search
CPC .............. G02B 27/0172; G02B 5/32; G02B 2027/0174; G02B 2027/0178
USPC ......................................................... 359/19
See application file for complete search history.

(56) References Cited

U.S. PATENT DOCUMENTS

| 5,185,815 A * | 2/1993 | Brandstetter ........ G02B 27/642 |
| | | 359/559 |
| 8,581,905 B2 * | 11/2013 | Mitchell ............... G06F 1/1613 |
| | | 345/419 |
| 10,210,844 B2 | 2/2019 | Kollin et al. |
| 11,222,471 B2 * | 1/2022 | Jo .......................... G03H 1/0005 |
| 11,561,511 B2 * | 1/2023 | Shin ....................... G03H 1/265 |
| 2002/0027712 A1 * | 3/2002 | Soskind .............. G02B 27/4216 |
| | | 359/565 |
| 2005/0248818 A1 * | 11/2005 | Ouchi .................. G02B 27/144 |
| | | 359/15 |
| 2015/0362734 A1 | 12/2015 | Moser et al. |
| 2016/0379606 A1 | 12/2016 | Kollin et al. |
| 2019/0041565 A1 * | 2/2019 | Masson ................ G03H 1/0248 |

(Continued)

FOREIGN PATENT DOCUMENTS

KR 1020120118621 A 10/2012
WO WO-2016142707 A1 * 9/2016 ......... G02B 27/0172

OTHER PUBLICATIONS

Mei-Lan Piao, Jae-Hyeung Park, Nam Kim, Hyun-Soo Kang. Phase optimization for phase contrast projection display. Proc. of SPIE vol. 7232 723212-1. © 2009 SPIE. doi: 10.1117/12.808808 (Year: 2009).*

(Continued)

*Primary Examiner* — Collin X Beatty
(74) *Attorney, Agent, or Firm* — Sughrue Mion, PLLC

(57) ABSTRACT

A holographic lens and a display apparatus using the same as a combiner, the holographic lens including a phase profile obtained through an optimization process for each position to form an imaging optical system for forming a virtual image of lights emitted from a plurality of areas.

24 Claims, 21 Drawing Sheets

(56) References Cited

U.S. PATENT DOCUMENTS

2019/0155028 A1* 5/2019 Svarichevsky ........ G02B 27/18
2021/0364987 A1* 11/2021 Li ........................ G03H 1/0404

OTHER PUBLICATIONS

Jang, C., et al., "Holographic Near-eye Display with Expanded Eye-box", ACM Trans. Graph, vol. 37, No. 6, Article 195, Nov. 2018, pp. 1-14.
Maimone, A., et al., "Holographic Near-Eye Displays for Virtual and Augmented Reality", ACM Transactions on Graphics, vol. 36, No. 4, Article 85, Jul. 2017, pp. 1-16.

* cited by examiner

HOLOGRAPHIC LENS AND APPARATUS INCLUDING THE SAME

CROSS-REFERENCE TO RELATED APPLICATION

This application is based on and claims priority under 35 U.S.C. § 119 to Korean Patent Application No. 10-2020-0166941, filed on Dec. 2, 2020, in the Korean Intellectual Property Office, the disclosure of which is incorporated by reference herein in its entirety.

BACKGROUND

1. Field

The disclosure relates to a holographic lens and an apparatus including the same.

2. Description of the Related Art

Virtual reality technology enables humans to have a real life experience in a virtual world created by computers. Augmented reality technology allows virtual images to be mixed with the physical environment or space of the real world.

Displays that provide virtual reality (VR) have reached the commercialization stage and are being widely applied to the entertainment industry. In addition, they are developing into a form that may be applied in medical, education, and industrial fields. An augmented reality (AR) display, an advanced form of a virtual reality display, is an imaging device that combines the real world and virtual reality, and may lead to interaction between reality and virtual reality. The interaction between reality and virtual reality is based on a function of providing real-time information about a real situation, and the effect of reality may be further increased by superimposing virtual objects or information on the environment of the real world. Such an augmented reality display includes a combiner for combining a virtual image with an external real foreground and providing it to an observer.

Recently, research into a glasses-type display apparatus that provides augmented reality (i.e., augmented reality (AR) glasses) is actively being conducted. Also, research is being conducted using angular selectivity, wavelength selectivity, and thin volume characteristics of a holographic optical element (HOE) in the combiner of the augmented reality device.

The combiner using the holographic optical element directly focuses an image on the viewer's eyes so that the viewer may see the image. The holographic optical element that directly focuses an image on the viewer's eyes serves as a holographic lens. In the holographic optical element, an area in which an image is focused is very small, and an eyebox, which is an area in which a user may fully observe a virtual image, is greatly limited and it is difficult to express depth. Accordingly, an image may be observed only when a user focuses his or her eye exactly at the point where the light is gathered, and the image becomes invisible when the eye rotates or AR glasses implemented with an augmented reality display shake even a little on the face. In this way, when the eyebox is greatly restricted, a correction process that adjusts a visible point of the image according to a user's eye interval after wearing the glasses is necessary, so that it is very cumbersome to use one AR glasses for users with various eye intervals.

SUMMARY

Provided are holographic lenses capable of obtaining an eyebox having a sufficient size when forming an imaging optical system, and display apparatuses using the same as a combiner.

Additional aspects will be set forth in part in the description which follows and, in part, will be apparent from the description, or may be learned by practice of the presented embodiments of the disclosure.

According to an aspect of the disclosure, there is provided a holographic lens comprising: a plurality of positions configured to form an imaging optical system that images lights emitted from a plurality of areas of a light emitting device on a corresponding plurality of virtual image points; and a phase profile obtained through an optimization process for each position of the plurality of positions.

According to the phase profile, a phase of each position of the plurality of positions in the holographic lens may be formed to have an optimized value satisfying $\min\|T\cdot(\delta-\rho)-\phi_{target}\|^2$, wherein $\rho$ is a phase of light emitted from each of the plurality of areas of the light emitting device, $\phi$ is a phase of the holographic lens, $\delta$ is a phase of light emitted from a virtual image, T is a projection matrix, and $\phi$target is a phase providing an intended virtual image.

For the light emitted from each of the plurality of areas, the holographic lens may be formed to have p number of phases for the each of the plurality of areas, and a number of the plurality of positions the phase profile of the holographic lens is smaller than a product of a number of positions of the holographic lens corresponding to the light emitted from each of the plurality of areas of the light emitting device and a number of the plurality of areas of the light emitting device.

The holographic lens is formed to have the phase profile configured to form the virtual image on a virtual image surface corresponding to each of the plurality of areas.

Phase distribution of the holographic lens may be formed to minimize an error with an ideal phase of an ideal holographic lens for an ideal imaging optical system.

The holographic lens may be formed by entirely recording the phase profile obtained through the optimization process on the holographic lens by controlling a spatial light modulator.

The phase profile of the holographic lens may be formed using a holographic printing technique in which the phase profile obtained through the optimization process is partitioned into a plurality of sections corresponding to the plurality of positions and a phase corresponding to each section is recorded by controlling the spatial light modulator.

The phase profile of the holographic lens may be formed by one recording by mounting the phase profile obtained through the optimization process on the spatial light modulator and expanding the phase profile by a size of the holographic lens to be recorded.

A reference beam applied to the phase profile recording of the holographic lens may be parallel light or has a phase corresponding to the lights emitted from the plurality of areas.

The phase profile of the holographic lens may be formed using a free-form lens having a curve corresponding to the phase profile obtained through the optimization process.

According to another aspect of the disclosure, there is provided a display apparatus comprising: an image-providing device configured to provide an image; and a combiner configured to combine the image emitted from the image-providing device and an external foreground, wherein the combiner comprises: a holographic lens having a plurality of positions configured to form an imaging optical system that images lights emitted from a plurality of pixels of the image providing device on a corresponding plurality of virtual image points; and a phase profile obtained through an optimization process for each position of the plurality of positions.

According to the phase profile, a phase of each position of the plurality of positions of the holographic lens may be formed to have an optimized value satisfying $\min\|T\cdot(\delta-\rho)-\emptyset_{target}\|^2$, when $\rho$ is a phase of light emitted from each pixel among the plurality of pixels of the image-providing device, $\phi$ is a phase of the holographic lens, $\delta$ is a phase of light emitted from a virtual image, T is a projection matrix, and $\phi$target is a phase providing an intended virtual image.

For the light emitted from each of the plurality of pixels of the image-providing device, the holographic lens may be formed to have p number of phases for the each of the plurality of pixels, and a number of positions of the phase profile of the holographic lens is smaller than a product of a number of positions of the holographic lens corresponding to the light emitted from each pixel of the image-providing device and a number of pixels of the image-providing device.

The holographic lens may have the phase profile configured to form the image on a virtual image surface corresponding to each of the plurality of pixels of the image-providing device.

Phase distribution of the holographic lens may be formed to minimize an error with an ideal phase of an ideal holographic lens for an ideal imaging optical system.

The holographic lens may be formed by entirely recording the phase profile obtained through the optimization process on the holographic lens by controlling a spatial light modulator.

The phase profile of the holographic lens may be formed using a holographic printing technique in which the phase profile obtained through the optimization process is partitioned into a plurality of sections corresponding to the plurality of positions and a phase corresponding to each section is recorded by controlling the spatial light modulator.

The phase profile of the holographic lens may be formed by one recording by mounting the phase profile obtained through the optimization process on the spatial light modulator and expanding the phase profile by the size of the holographic lens to be recorded.

A reference beam applied to the phase profile recording of the holographic lens may be parallel light or has a phase corresponding to the lights emitted from pixels of the image-providing device.

The phase profile of the holographic lens may be formed using a free-form lens having a curve corresponding to the phase profile obtained through the optimization process.

The display apparatus may be an augmented reality (AR) display apparatus of a head mounted type, glasses type, goggles type, or head-up type.

The display apparatus may further comprise: a transparent member having an incident surface parallel to the image-providing device, wherein the holographic lens is provided on one surface of the transparent member.

The display apparatus may be a glasses type display apparatus, and wherein the transparent member is a lens of the glasses type display apparatus.

The image-providing device may be provided above the transparent member.

The image-providing device may be provided above the transparent member.

The display apparatus may be an augmented reality (AR) display apparatus of a head mounted type, glasses type, goggles type, or head-up type.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 shows a schematic diagram of a display apparatus to be constructed and a sample of each configuration, and FIG. 4 shows a process of deriving an optimization equation for obtaining a phase for each position in which a holographic lens according to an embodiment forms an imaging optical system;

DETAILED DESCRIPTION

Figure 1:
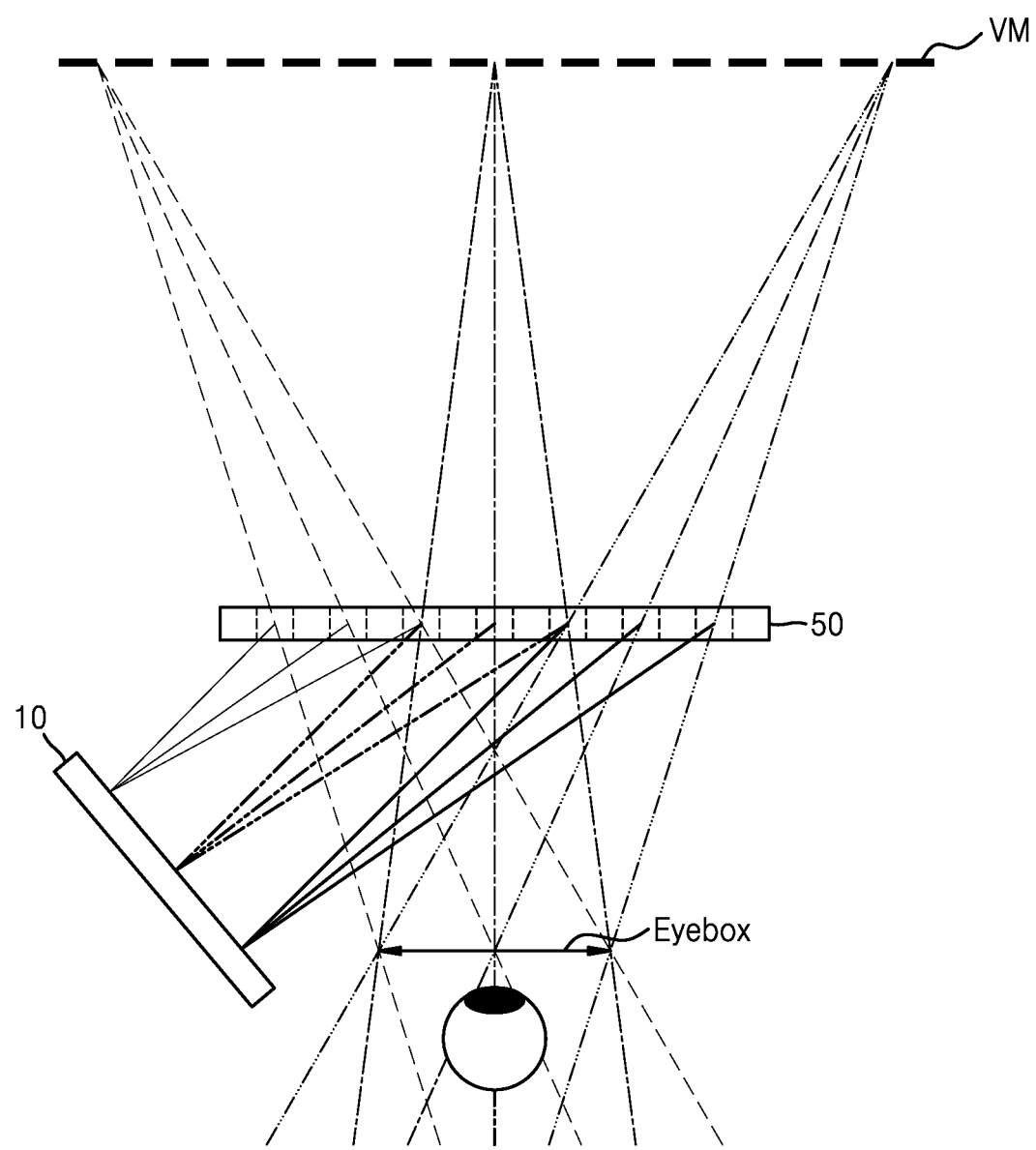
FIG. 1 is a view of a configuration of a display apparatus in which a holographic lens according to an example embodiment is applied as a combiner.

Reference will now be made in detail to embodiments, examples of which are illustrated in the accompanying drawings, wherein like reference numerals refer to like elements throughout. In this regard, the embodiments of the disclosure may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described in detail with reference to the accompanying drawings. The same reference numerals refer to the same elements throughout. In the drawings, the sizes of constituent elements may be exaggerated for clarity. The embodiments described below are only examples, and thus, it should be understood that the embodiments may be modified in various forms.

For example, when an element is referred to as being "on" or "above" another element, it may be directly on the other element, or intervening elements may also be present. It will be understood that, although the terms "first," "second," etc. may be used herein to describe various elements, these elements should not be limited by these terms. These terms are used only to differentiate an element from another element. These terms do not limit the material or structure of the components. As used herein, the singular forms "a," "an," and "the" are intended to include the plural forms as well, unless the context clearly indicates otherwise. In addition, it will be understood that when a unit is referred to as "comprising" another element, it does not preclude the possibility that one or more other elements may exist or may be added. The use of the terms "a," "an," and "the" and similar referents is to be construed to cover both the singular and the plural.

A holographic lens responds only to light incident at a certain angle and having a certain wavelength. In addition, because the holographic lens is recorded on a thin film, the holographic lens is easy to place in an optical device and may reduce the size of the entire system. Based on these features, the holographic lens may be applied as a combiner to a virtual reality (VR) device or augmented reality (AR) device of a head mounted, glasses, or goggles type, augmented reality glasses, or various augmented reality devices such as a head-up display (HUD).

In other words, when light having the same direction and wavelength characteristics as those of a reference beam is projected onto the holographic lens, the light is diffracted with the same profile as a signal beam, and other light is transmitted without any optical effect, so that the holographic lens may be applied as a combiner to various devices such as augmented reality glasses and HUD.

Recording of the holographic lens includes a method of using parallel light or light close to parallel light as a reference beam and light that converges through a lens as a signal beam, and a method of using light emitted from a point light source and light that converges through a lens as a reference beam and signal beam, respectively. An appropriate recording method may be selected and used according to the type of system to which the holographic lens is applied. In addition to this, there may be modified types of recording methods, but all of them are conducted without significantly deviating from the above two methods.

Meanwhile, when applying the holographic lens to a display apparatus such as a virtual reality (VR) device or an augmented reality (AR) device as a combiner, the holographic lens is required to form a virtual image of light emitted from different pixels of an image-providing device that provides an image. Because a display panel or a spatial light modulator of the image-providing device includes a two-dimensional array of pixels, light emitted from each pixel of the image-providing device becomes divergent light having a certain divergence angle.

When an image-providing device is placed in front of a holographic lens to form a display image, a ray emitted from each pixel is diffracted by the holographic lens, so that a virtual image of the pixel is formed on a space. Ideally, the holographic lens will not respond to light different from recording conditions of the holographic lens. However, in practice, due to angular selectivity and wavelength selectivity, the holographic lens may respond to light projected with a small angle difference from the recording conditions. When the holographic lens responds to light of an angular component different from the recording conditions and forms a virtual image, optical aberration may occur.

Because light emitted from each pixel of the image-providing device becomes divergent light having a certain divergence angle, for example, when applying a holographic lens recorded using parallel light or light emitted from a point light source as a reference beam, a virtual image is formed after most of the lights emitted from the pixels are projected under conditions different from the recording conditions and diffracted when viewed from a holographic lens surface. In this way, light incident differently from the recording conditions is diffracted in an unintended direction, and thus a virtual image cannot be clearly formed at an intended depth. In other words, when the holographic lens is used as an imaging optical system to make an eyebox, the user sees a distorted virtual image. When a distance between the image-providing device and the holographic lens is designed to be very far so that the angular component does not deviate much from the recording conditions, the holographic lens may be used as an imaging optical system. However, in this case, there is a limitation in that a field of view (FOV) of a virtual image is reduced. In addition, it is difficult to design a very far distance between the image-providing device and the holographic lens in an augmented reality device with spatial distance constraints.

For example, when a holographic lens is recorded using parallel light as a reference beam and then an image from the image-providing device is imaged as a virtual image using the corresponding holographic lens, a distorted virtual image is formed due to aberration. Therefore, it is impossible to use a holographic lens as a lens for imaging optics in an augmented reality device. To solve this problem, methods of placing an aberration compensation optical system between a holographic lens and a display may be considered, but it is very difficult to manufacture such an optical system, and this optical system has a limitation that it occupies a lot of space.

As will be described below with reference to FIGS. 1 to 4, a holographic lens 50 according to an example embodiment has a phase profile obtained through an optimization process for each position to form an imaging optical system that forms an image of light emitted from a plurality of areas, for example, light emitted from a plurality of pixels of an image-providing device 10 on a plurality of corresponding virtual image points. To this end, the holographic lens 50 according to an embodiment has a phase profile recorded for each position so that an imaging optical system without optical aberration may be formed by computationally modulating a phase profile of a signal beam during a recording process.

When the holographic lens 50 according to an embodiment is applied as a combiner to a display apparatus, because lights from different pixels of the image-providing device 10 may be imaged as a virtual image by the holographic lens 50, a virtual image may be made cleanly at an intended depth, and an eyebox of sufficient size and a wide viewing angle may be simultaneously implemented.

Figure 2:
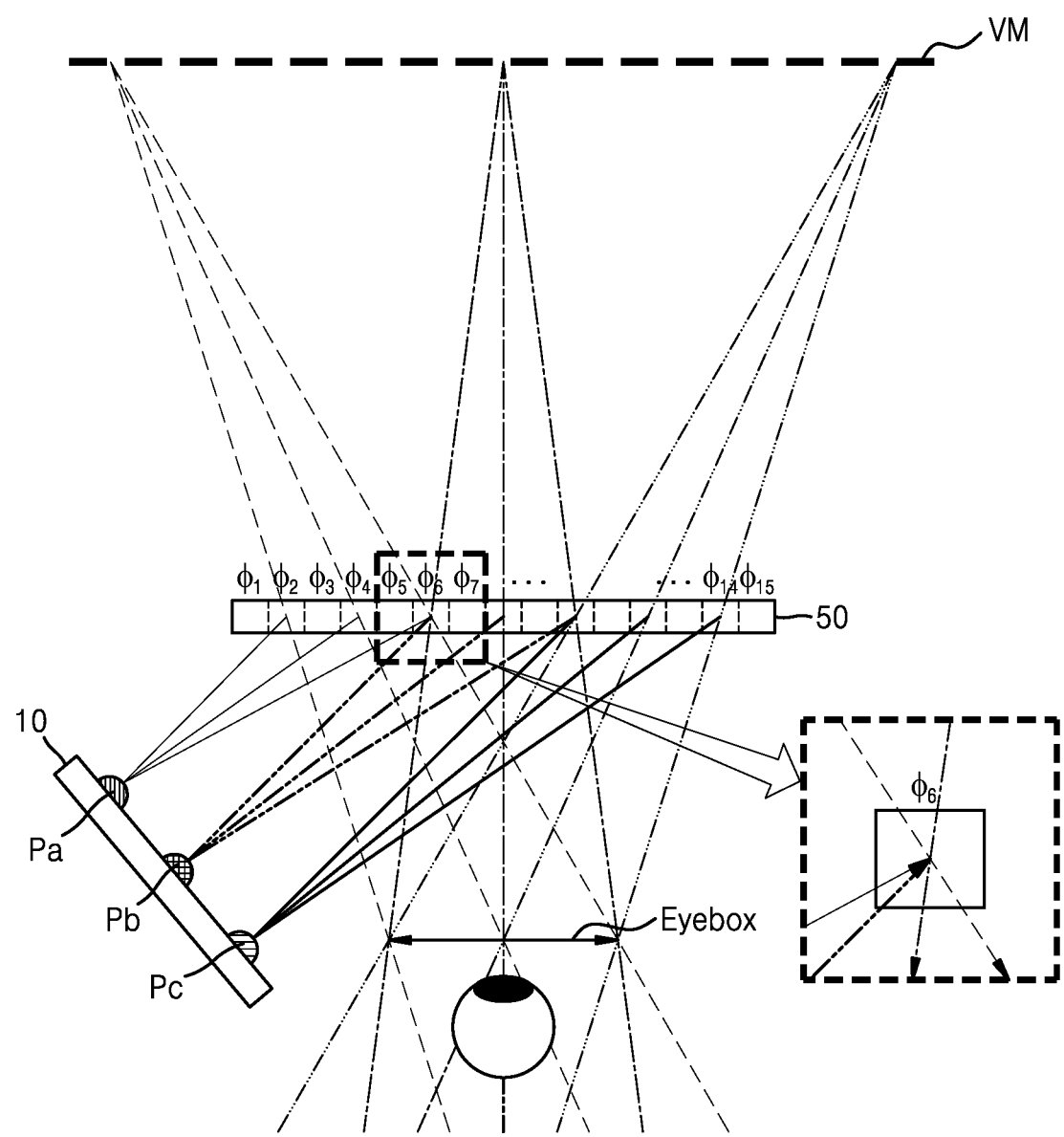
FIG. 2 is a view illustrating a principle of forming an imaging optical system that forms a virtual image of lights from different pixels of an image-providing device that provides an image by applying a holographic lens according to an example embodiment as a combiner in the display apparatus of FIG. 1.

FIG. 1 schematically shows a configuration of a display apparatus in which the holographic lens 50 according to an example embodiment is applied as a combiner. FIG. 2 schematically shows a principle of forming an imaging optical system that forms a virtual image of lights from different pixels Pa, Pb, and Pc of the image-providing device 10 that provides an image by applying the holographic lens 50 according to an example embodiment as a combiner in the display apparatus of FIG. 1, and shows an exemplary phase profile of the holographic lens 50 according to an example embodiment as compared with FIG. 1. In FIGS. 1 and 2, reference numeral VM denotes a plane on which a virtual image is formed at an intended depth.

Referring to FIGS. 1 and 2, the image-providing device 10 may include a display panel or a spatial light modulator. Because the image-providing device 10 includes a two-dimensional array of pixels, light emitted from each pixel of the image-providing device 10 becomes divergent light having a certain divergence angle. FIGS. 1 and 2 illustrate an imaging process of lights emitted from three pixels of the image-providing device 10 by way of explanation and convenience of illustration. Because the light emitted from each pixel of the image-providing device 10 corresponds to divergent light having a certain divergence angle, the pixels Pa, Pb, and Pc are illustrated as point light sources in FIG. 2 as an example.

As exemplarily shown in FIG. 2, in a display apparatus to which the holographic lens 50 is applied as a combiner, light incident from the image-providing device 10 to the holographic lens 50 may correspond to light emitted from a plurality of point light source arrays. Each pixel of the image-providing device 10 may correspond to a point light source.

Therefore, the holographic lens 50 according to an example embodiment may be formed to have a phase profile obtained through an optimization process for each position to form an imaging optical system that images lights emitted from a plurality of point light sources on a corresponding plurality of virtual image points. The phase profile of the holographic lens 50 may be obtained by calculating a phase of the holographic lens 50 and then recording a lens profile having the corresponding phase.

As such, the holographic lens 50 according to an example embodiment has a phase profile obtained through an optimization process for each position, and when applied as a combiner to a display apparatus, may form an imaging optical system that forms a virtual image of light emitted from different pixels of the image-providing device 10 that provides an image. Accordingly, the lights emitted from different pixels of the image-providing device 10 may be imaged as a virtual image on the virtual image plane VM by the holographic lens 50, so that a virtual image may be made cleanly at an intended depth, and an eyebox of sufficient size and a wide viewing angle may be simultaneously implemented.

Referring to FIG. 2, by sampling the phase of the holographic lens 50, the phase of each area may be defined as $\phi 1$ to $\phi M$. In FIG. 2, a case in which the holographic lens 50 has a phase of $\phi 1$ to $\phi 15$ for each area is illustrated as an example. In FIGS. 1 and 2, phase areas of the holographic lens 50 are indicated to be separated by dashed lines, which indicates that the holographic lens 50 is formed to have a phase value set for each area to form an imaging optical system. The holographic lens 50 may have a two-dimensional array of phase areas having a phase value set for each area.

Light reaching each area of the holographic lens 50 from the image-providing device 10 is diffracted by a recorded phase to form a virtual image. To this end, a phase of each area of the holographic lens 50 may be calculated so that an appropriate virtual image may be formed. For example, light emitted from one pixel Pa is diffracted by areas $\phi 2$, $\phi 3$, $\phi 4$, $\phi 5$, and $\phi 6$ and then transmitted to a user, and at this time, the user recognizes that a virtual image of the corresponding pixel Pa is formed at a point where extension lines of these light converge. Likewise, light emitted from the pixel Pb and light emitted from the pixel Pc are diffracted by the phase areas for each position of the holographic lens 50 and then transmitted to a user. At this time, the user recognizes that each of virtual images of the corresponding pixel Pb and the pixel Pc is formed at a point where extension lines of these lights converge. In order for a user to observe a complete virtual image without aberration, light emitted from each of the pixels Pa, Pb, and Pc needs to be diffracted in a plurality of phase areas of the holographic lens 50 and then collected into a single point. When positions of the image-providing device 10 and the holographic lens 50 are fixed, for example, the phases $\phi 2$, $\phi 3$, $\phi 4$, $\phi 5$, and $\phi 6$ for each area of the holographic lens 50 that image lights emitted from the pixel Pa into one point may be determined as one value through calculation. When the phases $\phi 1$ to $\phi M$ of each area of the holographic lens 50 may be calculated through calculation so that all pixels may be imaged with points at appropriate positions, the holographic lens 50 may be applied as a combiner in a display apparatus and used as an imaging optical system.

However, as shown in FIG. 2, because lights from adjacent pixels share a phase area with each other, the phases $\phi 1$, $\phi 2$, . . . , $\phi M$ for each area may not be determined as one value.

For example, looking at the phase area $\phi 6$ in FIG. 2, light emitted from the pixel Pa needs to be diffracted to form a point on the left, and light emitted from the pixel Pb needs to be diffracted to form a center point. However, it is not possible to fully implement these two roles at the same time with one phase value. As such, phase values for each area of the holographic lens 50 may not be determined as one value because the phase values for each area of the holographic lens 50 need to appropriately diffract lights from several pixels, and need to be calculated to minimize an error through an optimization technique.

Figure 3:
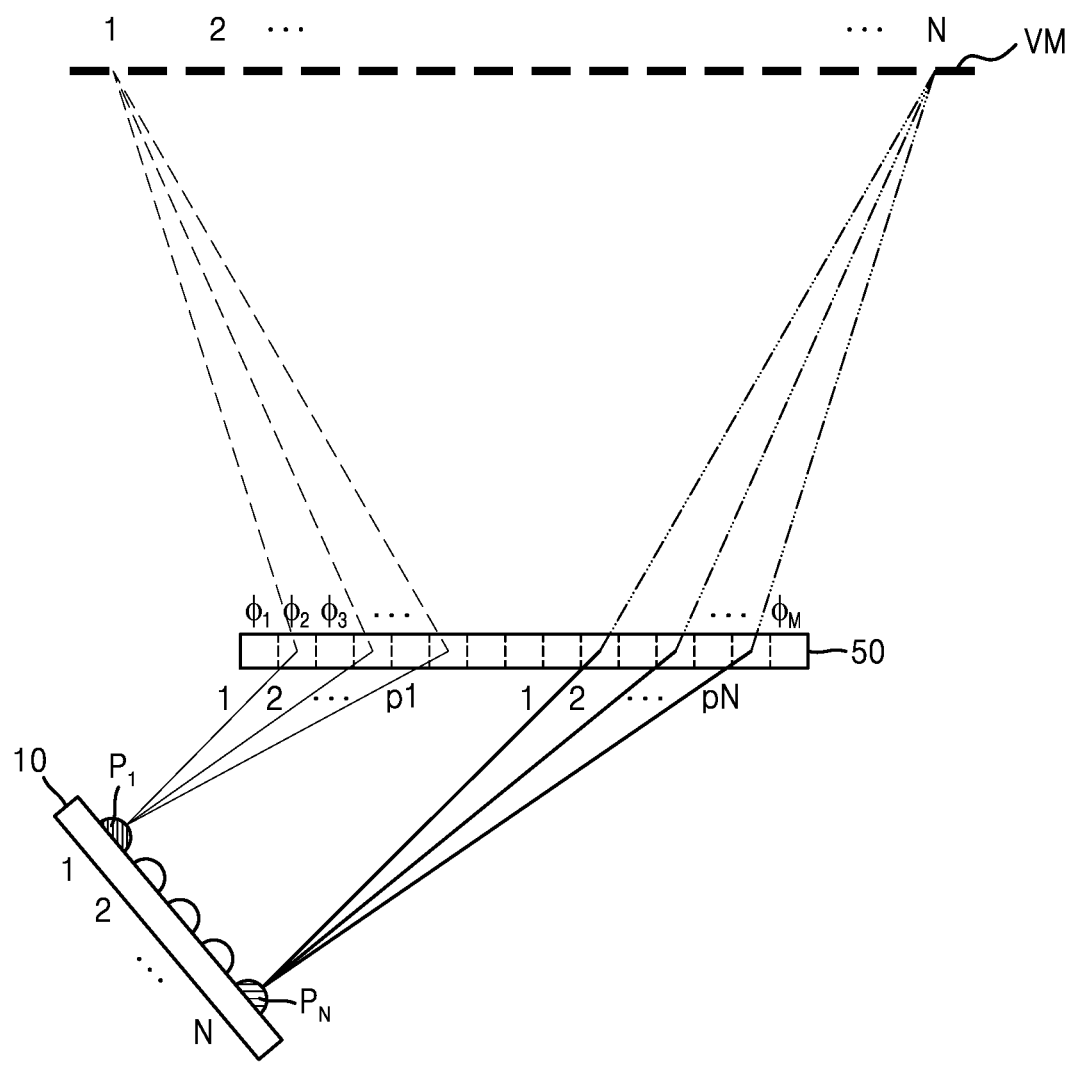
FIGS. 3 and 4 are views illustrating an optimization process of a phase profile for each position of a holographic lens according to an example embodiment, where
Figure 4:
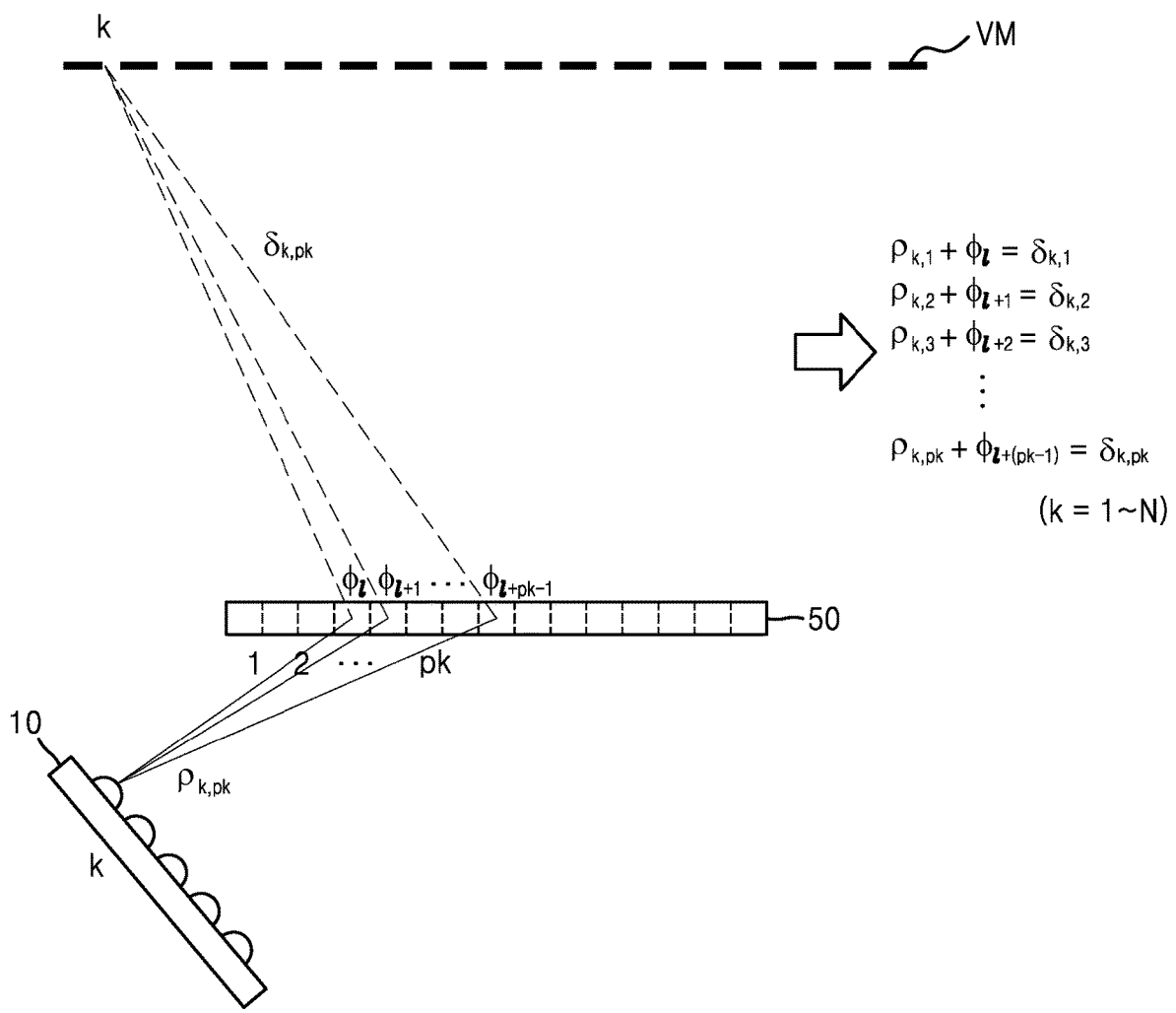

FIGS. 3 and 4 are views illustrating an optimization process of a phase profile for each position of the holographic lens 50 according to an example embodiment. According to an example embodiment, FIG. 3 shows a schematic diagram of a display apparatus to be constructed and a sample of each configuration, and FIG. 4 shows a process of deriving an optimization equation for obtaining a phase for each position in which the holographic lens 50 forms an imaging optical system.

For example, as shown in FIG. 3, the image-providing device 10 may include N pixels $P_1, \ldots, P_N$, and the holographic lens 50 may be sampled in a total of M areas according to an example embodiment. Because the image-providing device 10 includes N pixels $P_1, \ldots, P_N$, a virtual image formed in a space may also include N points. Considering that rays emitted from each of the pixels $P_1, \ldots, P_N$ of the image-providing device 10 are projected with a certain divergence angle, rays within the divergence angle from each of the pixels $P_1, \ldots, P_N$ may be sampled. For example, it can be assumed that the total number of rays emitted from pixel 1 ($P_1$) is p1 (1 to p1), the total number of rays emitted from pixel 2 ($P_2$) is p2, . . . , and the total number of rays emitted from pixel N ($P_N$) is pN. In this case, the total number of rays emitted from the image-providing device 10 is p1+p2+p3+ . . . +pN, and the holographic lens 50 may be sampled with a total of M. Therefore, assuming a semi-continuous situation, the total number of sampled rays may be greater than the number of sampling in a phase area of the holographic lens 50. The ray may mean each light area when divergent light emitted from each pixel is divided into a certain number.

An optimization process may be applied in order to diffract rays sampled in a large number to a intended position through a phase for each area of the holographic lens 50 less than the number of rays. When the number of sampled rays and the number of sampled phase areas are the same, a phase value of each area may be determined as one value. However, as shown in FIG. 2, when there is a phase area shared by rays emitted from adjacent pixels, a phase value of each phase area of the holographic lens 50 is not determined as one value, and the phase value of each phase area may be determined as a value that minimizes an error with a target phase value.

For example, as shown in FIG. 4, when defining a phase of light emitted from the pixel of the image-providing device 10 as $\rho$, a phase of the holographic lens 50 as $\varphi$, and a phase of light emitted from the virtual image as $\delta$, when a phase relational expression for all rays emitted from the image-providing device 10 is summarized, it can be expressed as shown on the right side of FIG. 4.

In the phase relational expression, $\rho$ on the left side and $\delta$ on the right side are total p1+p2+p3+ . . . +pN, and $\varphi$ is a total of M. That is, a total of M phase relational expressions are obtained.

When the phase relation shown on the right side of FIG. 4 is summarized for all k, a determinant such as Equation 1 may be derived.

$$\varphi_0 = T \cdot (\delta - \rho) \quad \text{Equation 1}$$

In Equation 1, T may be a projection matrix, $\varphi_0$ may be, for example, M by 1 column matrix, and each of $\delta$ and $\rho$ may be, for example, (p1+p2+p3+ . . . +pN) by 1 column matrix.

According to an example embodiment, $\varphi_0$ may be updated for the most basic optimization equation solved by the least square as shown in Equation 2.

[Equation 2]

$$\min\|T \cdot (\delta - \rho) - \varphi_{target}\|^2 \quad \text{Equation 2}$$

In Equation 2, $\varphi_{target}$ is a phase that provides an intended virtual image.

As shown in Equation 2, an optimized 00 value may be obtained by calculating iteration so that an error between a result of the determinant defined in Equation 2 and $\varphi_{target}$, which is the phase that provides the intended virtual image, is minimized. Other numerical calculation methods or optimization calculation methods may also be used to calculate phase value distribution that minimizes an intended error.

As such, the holographic lens 50 according to an example embodiment may have a phase profile obtained through an optimization process for each position in the holographic lens 50 to form an imaging optical system that forms an image of light emitted from a plurality of areas, for example, a plurality of pixels of an image-providing device 10 on a plurality of corresponding virtual image points.

For example, when $\rho$ is a phase of the light emitted from the plurality of areas (i.e., a plurality of pixels of an image-providing device 10), $\varphi$ is a phase of the holographic lens 50, $\delta$ is a phase of light emitted from a virtual image, T is a projection matrix, and $\varphi_{target}$ is a phase providing an intended virtual image, a phase of each area of the holographic lens 50 may be formed to have an optimized value satisfying $\min\|T \cdot (\delta - \rho) - \varphi_{target}\|^2$.

At this time, for light emitted from each of a plurality of areas, for example, a plurality of pixels of the image-providing device 10, the holographic lens 50 may be formed to have p number of phases for each area of the image-providing device 10, and the number of areas of a phase profile of the holographic lens may be smaller than a product of the number of areas of the holographic lens 50 corresponding to the light emitted from each of the plurality of areas of the image-providing device 10 and the number of the plurality of areas of the image-providing device 10.

The holographic lens 50 may be formed to have a phase profile for forming a virtual image on a virtual image surface to correspond to each of a plurality of areas, for example, a plurality of pixels of the image-providing device 10. In addition, phase distribution of the holographic lens 50 may be provided to satisfy a condition in which an error with the phase of the holographic lens 50 for an ideal imaging optical system is minimized.

The holographic lens 50 according to an example embodiment may be formed by recording a phase profile obtained through an optimization calculation in a certain member, for example, a polymer film, in various ways to form an imaging optical system that forms an image of light emitted from a plurality of areas, for example, a plurality of pixels of an image-providing device 10 on a plurality of corresponding virtual image points.

According to an example embodiment, an apparatus may include a memory storing one or more instructions and a processor that executes the one or more instructions to perform the optimization process or the optimization calculation illustrated in FIG. 4 above. For example, the processor may calculate an optimized $\varphi_0$ value, using Equation 2, by calculating iteration so that an error between a result of the determinant defined in Equation 2 and $\varphi_{target}$, which is the phase that provides the intended virtual image, is minimized. The processor may further perform other numerical calculation methods or optimization calculation methods to calculate phase value distribution that minimizes an intended error. According to an example embodiment, the memory may be random access memory (RAM) and the processor may be central processing unit (CPU). However, the disclosure is not limited thereto.

Figure 5:
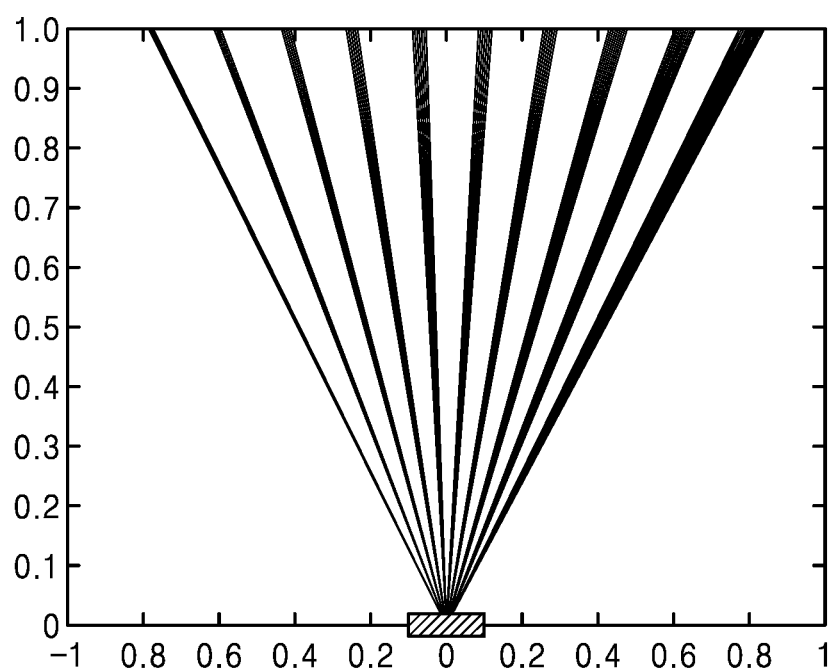
FIG. 5 is a view illustrating a state in which a virtual image of a plurality of pixels of an image-providing device is formed using a holographic lens according to an example embodiment.

FIG. 5 shows a state in which a virtual image of a plurality of pixels of the image-providing device 10 is formed by using the holographic lens 50 according to an example embodiment. The result of FIG. 5 shows a result of obtaining a phase of the holographic lens 50 according to an example embodiment in which an imaging optical system is formed through an optimization process, and performing a one-dimensional point spread function (PSF) simulation.

As shown in FIG. 5, when the holographic lens 50 according to an example embodiment is applied, it can be seen that the virtual image is formed in a sufficiently sharp state.

Figure 6A:
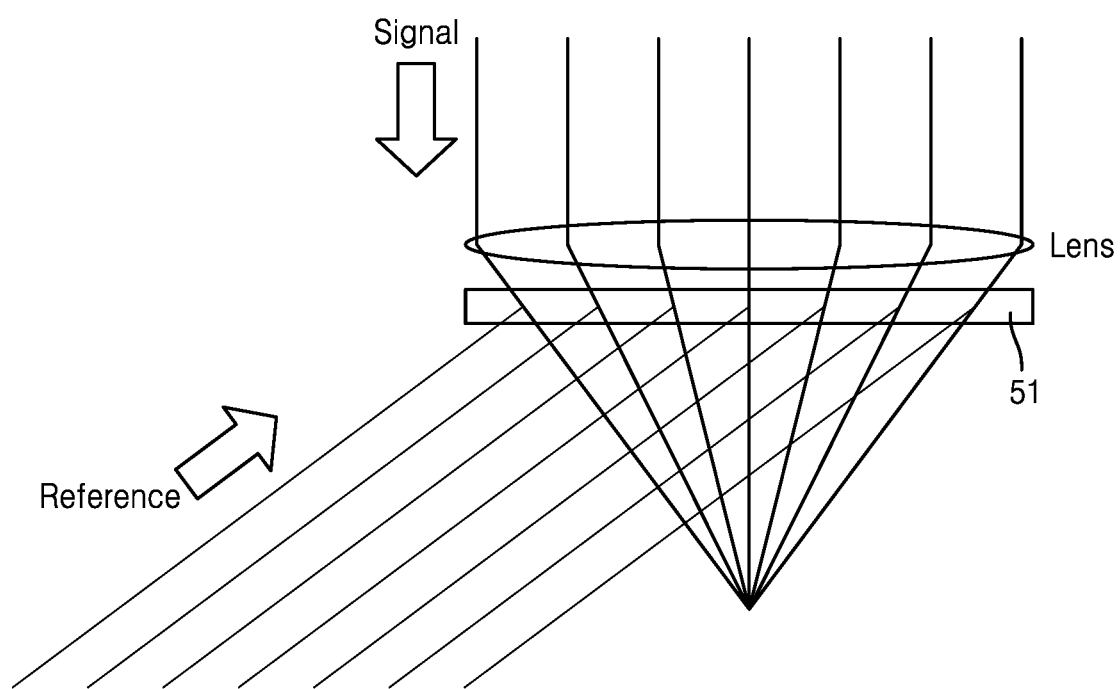
FIG. 6A is a view illustrating a method of recording a holographic lens by using parallel light as a reference beam, and using light that converges after passing through a lens as a signal beam.
Figure 6B:
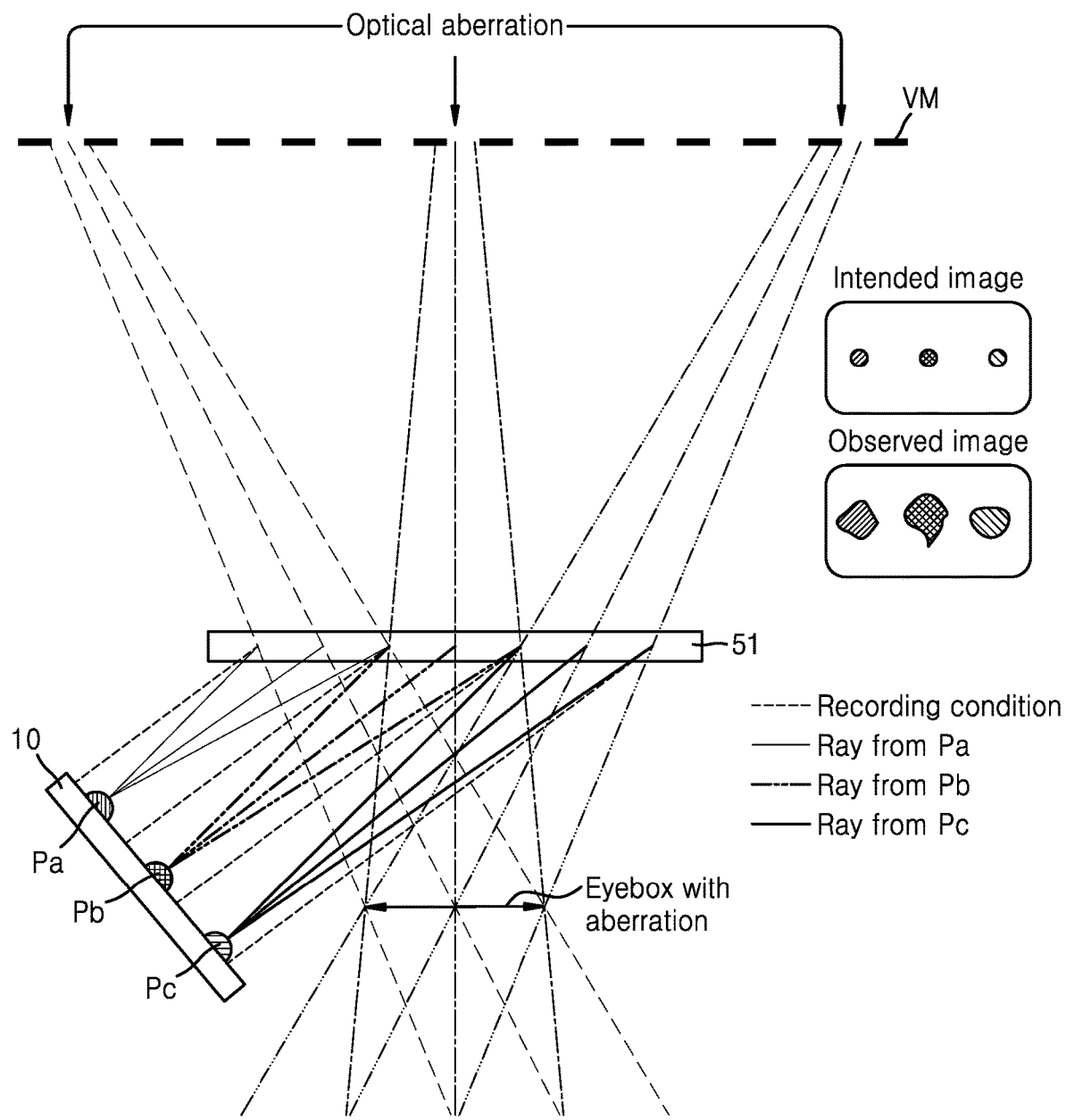
FIG. 6B is a view of an optical path when the holographic lens recorded by the method of FIG. 6A is used as an imaging optical system.
Figure 6C:
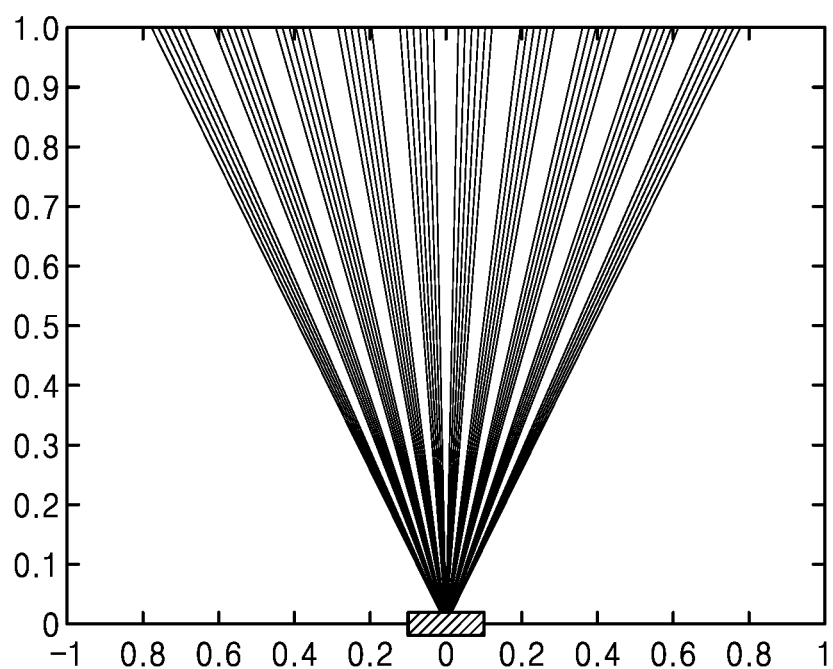
FIG. 6C is a view illustrating a state in which a virtual image of a plurality of pixels of an image-providing device is formed by using the holographic lens recorded by the method of FIG. 6A.

As a comparative example, FIG. 6A shows a method of recording a holographic lens 51 by using parallel light as a reference beam, and using light that converges after passing through a lens as a signal beam. FIG. 6B is a view of an optical path when the holographic lens 51 recorded by the method of FIG. 6A is used as an imaging optical system. FIG. 6C shows a state in which a virtual image of a plurality of pixels of the image-providing device 10 is formed by using the holographic lens 51 recorded by the method of FIG. 6A.

Figure 7A:
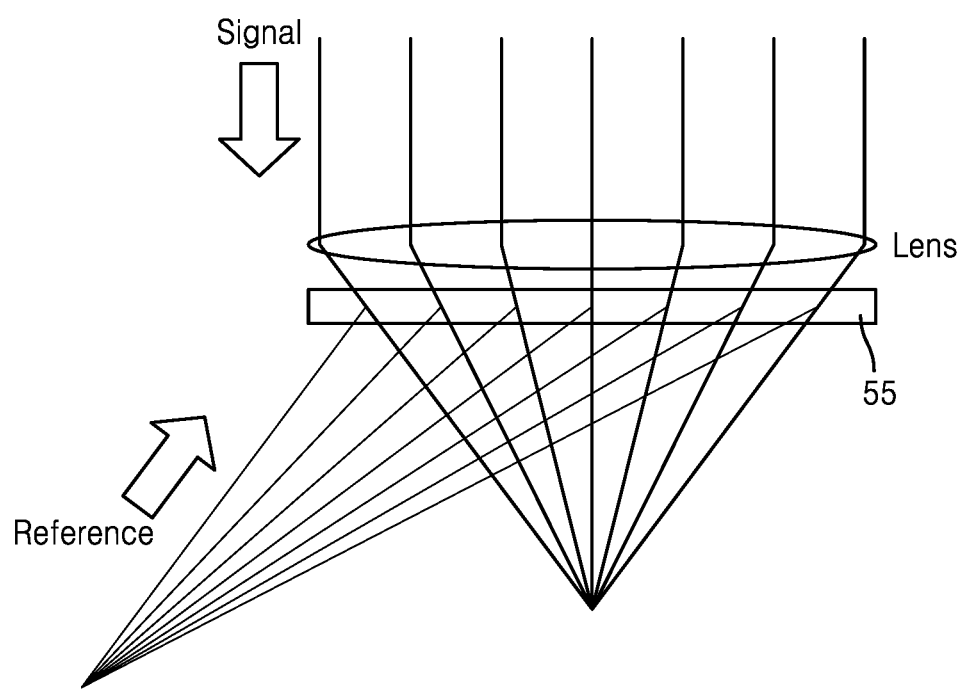
FIG. 7A is a view illustrating a method of recording a holographic lens by using light emitted from a point light source as a reference beam, and using light that converges after passing through a lens as a signal beam.
Figure 7B:
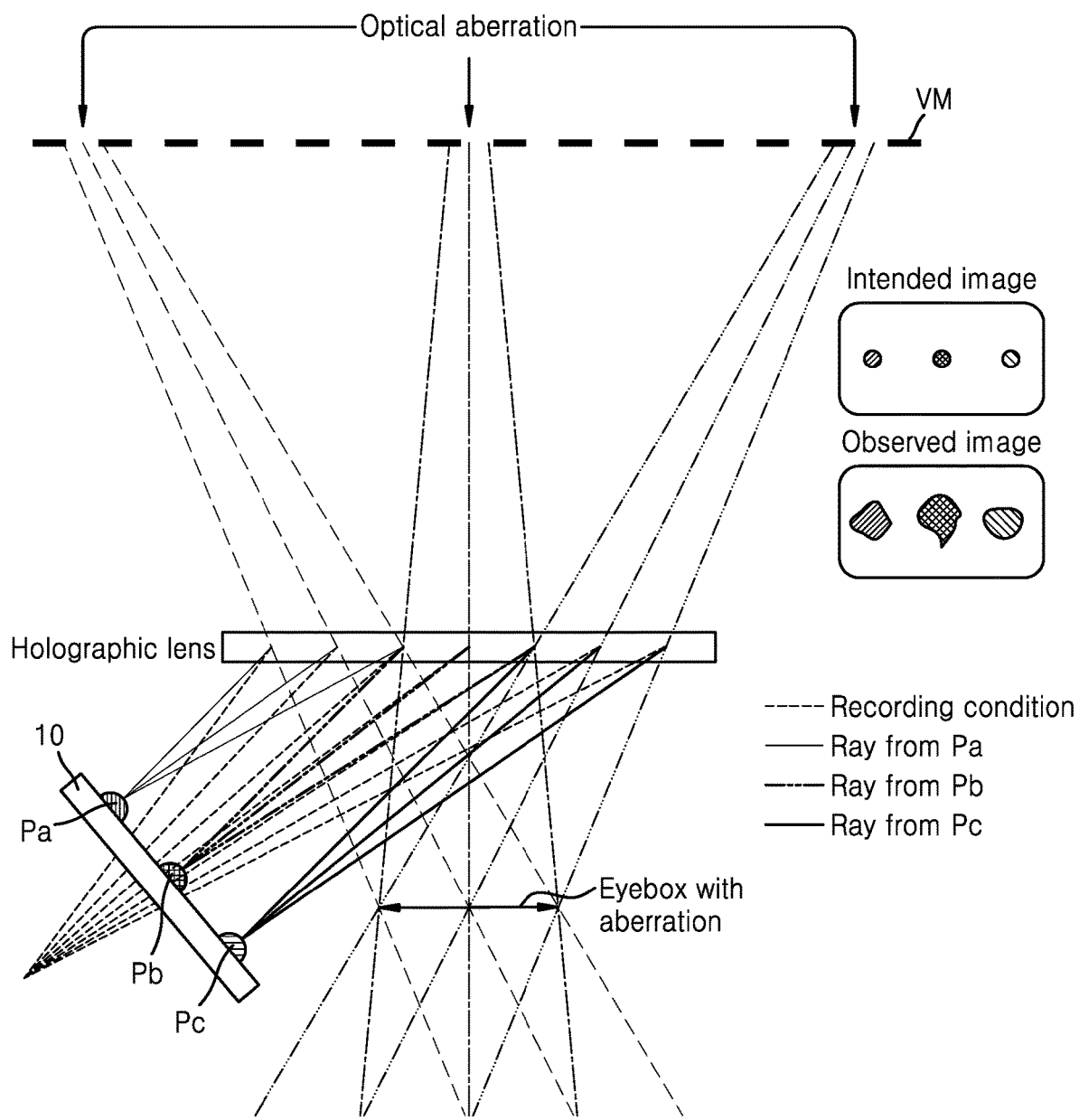
FIG. 7B is a view of an optical path when the holographic lens recorded by the method of FIG. 7A is used as an imaging optical system.
Figure 7C:
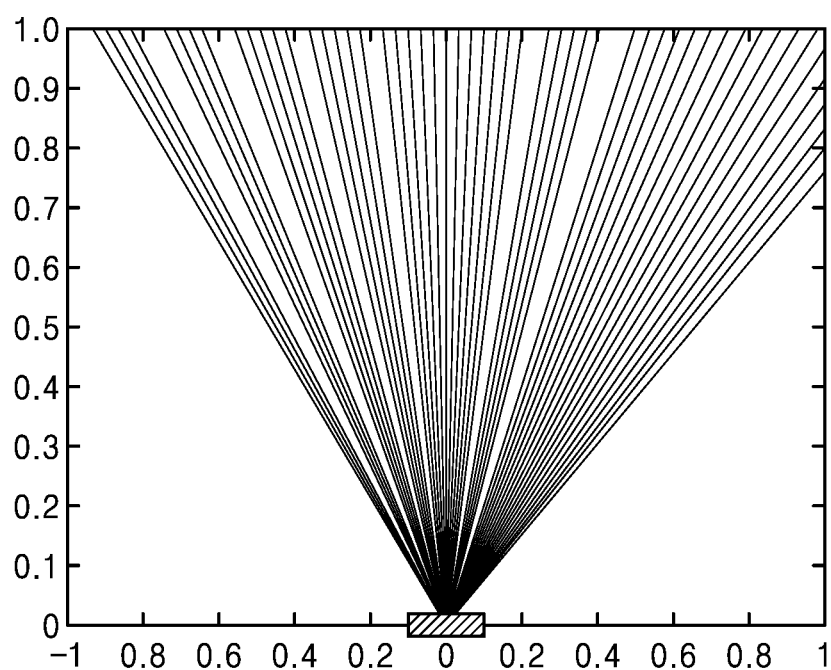
FIG. 7C is a view illustrating a state in which a virtual image of a plurality of pixels of an image-providing device is formed by using the holographic lens recorded by the method of FIG. 7A.

As another comparative example, FIG. 7A shows a method of recording a holographic lens 55 by using light emitted from a point light source as a reference beam, and using light that converges after passing through a lens as a signal beam. FIG. 7B shows an optical path when the holographic lens 55 recorded by the method of FIG. 7A is used as an imaging optical system. FIG. 7C shows a state in which a virtual image of a plurality of pixels of the image-providing device 10 is formed by using the holographic lens 55 recorded by the method of FIG. 7A.

When the image-providing device 10 is placed in front of the holographic lens 51 or 55 of the comparative examples in FIGS. 6A-C and 7A-C to form an image provided by the image-providing device 10, a ray emitted from each pixel is diffracted by the holographic lens 51 or 55, so that a virtual image of the pixel is formed on a space. As described above, because of the angular selectivity and wavelength selectivity, the holographic lenses 51 and 55 respond to light projected with a small angle difference from recording conditions, as shown in FIGS. 6B and 7B, severe optical aberration occurs when the holographic lenses 51 and 55 respond to light of an angle component different from recording conditions of FIGS. 6A and 7A to form a virtual image. When viewed from surfaces of the holographic lenses 51 and 55, most of the lights emitted from the pixels are projected under conditions different from the recording conditions and diffracted to form a virtual image. In this way, light incident differently from the recording conditions is diffracted in an unintended direction, and thus a virtual image cannot be clearly formed at an intended depth. That is, in a case of using the holographic lens 51 or 55 of the comparative example as an imaging optical system to make an eyebox, a virtual image shown in an eyebox includes aberrations, and a user sees a distorted virtual image. On the right sides of FIGS. 6B and 7B, the difference between intended images and observed images obtained by applying the holographic lenses 51 and 55 of the comparative example is shown. The difference is due to the fact that conditions for recording the holographic lenses 51 and 55 of the comparative example are parallel light or light emitted from one point light source, whereas the pixels Pa, Pb, and Pc of the actual image-providing device 10 act as point light sources, respectively, so that rays from a plurality of point light source arrays are imaged by the holographic lenses 51 and 55 of the comparative example. By this optical aberration, in both cases of forming an image by using the holographic lenses 51 and 55 of the comparative example recorded using parallel light and a point light source as a reference light, as shown in FIGS. 6C and 7C, it can be seen that rays are not mapped to points and spread out to form an image.

On the other hand, as can be seen from FIG. 5, when an image is formed using the holographic lens 50 according to an example embodiment, it can be seen that the imaging performance is significantly higher than that of the holographic lenses 51 and 55 of the comparative example.

When phase distribution of the holographic lens 50 according to an example embodiment to be formed by an optimization method is obtained by calculation, a phase profile is, for example, as exemplarily shown in FIGS. 8 to 11, may be entirely recorded in various ways on a certain member 50', such as a polymer film, by controlling a spatial light modulator. Accordingly, the holographic lens 50 according to an example embodiment may be formed to form an imaging optical system that forms an image of light emitted from a plurality of areas, for example, a plurality of pixels of the image-providing device 10 on a plurality of corresponding virtual image points.

Figure 8:
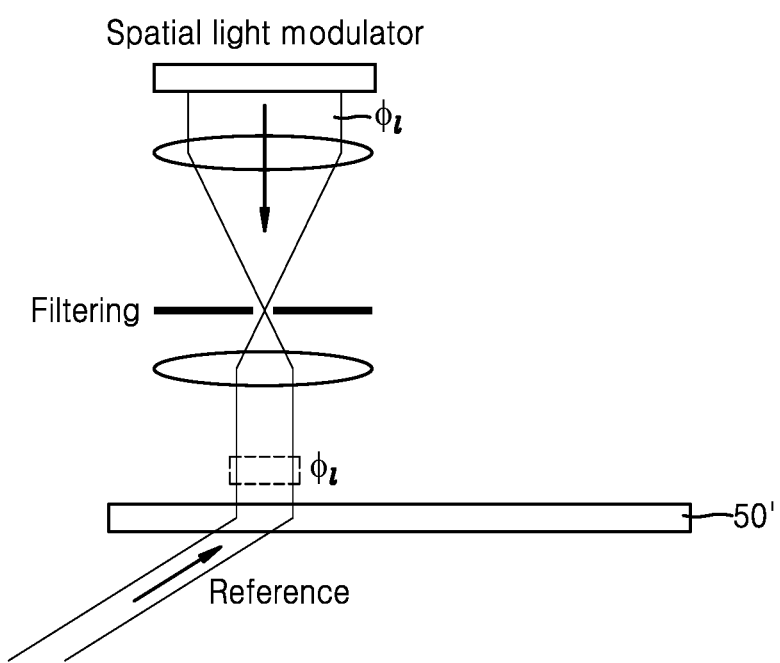
FIGS. 8, 9, 10 and 11 are views illustrating various methods of recording a phase profile of a holographic lens according to an example embodiment.

FIG. 8 shows a method of recording a phase profile of the holographic lens 50 according to an example embodiment by using a holographic printer technique.

Referring to FIG. 8, the holographic lens 50 according to an example embodiment may be formed by appropriately partitioning the phase profile of the holographic lens 50 obtained through the optimization calculation above into a plurality of sections and recording the phase profile corresponding to each section in the certain member 50', for example, a polymer film, by controlling of a spatial light modulator (SLM).

Figure 9:
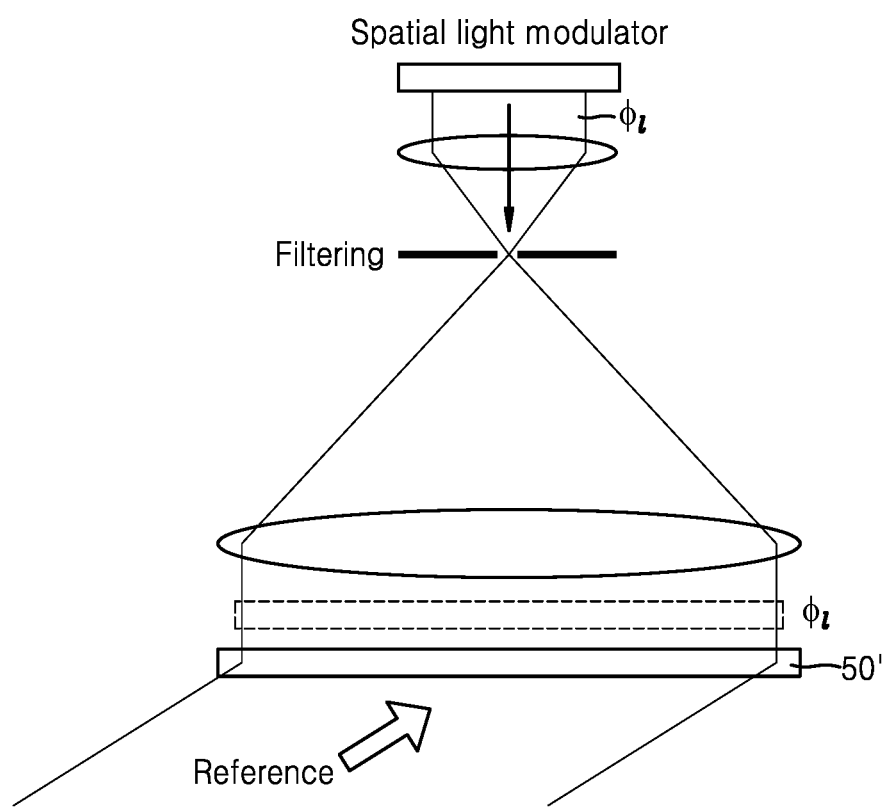
Figure 10:
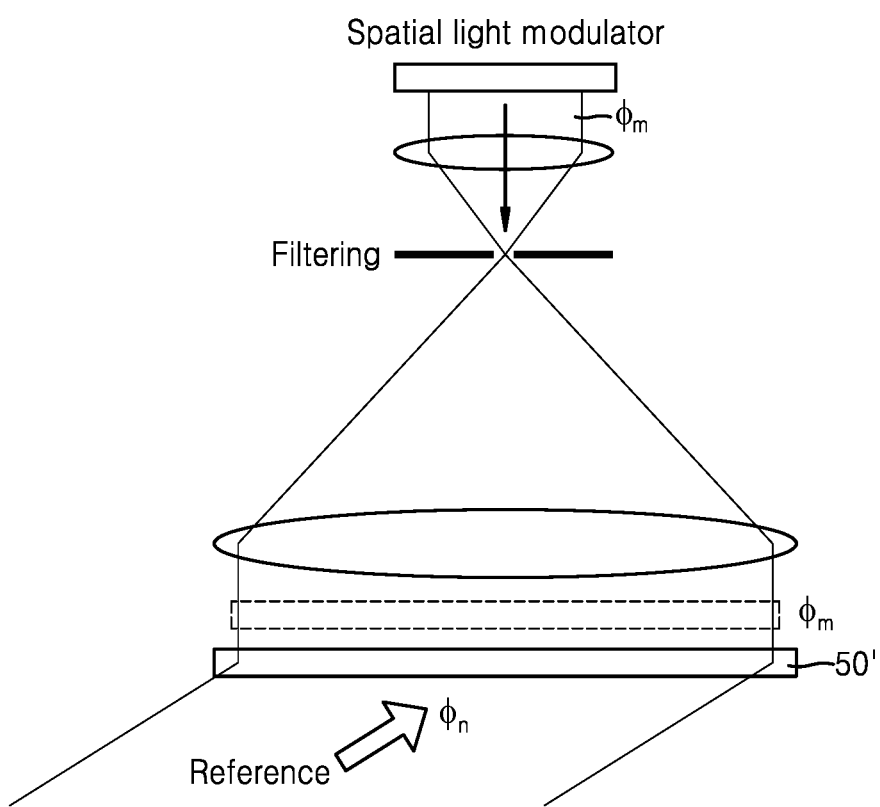

As shown in FIG. 8, in a case of a method of partitioning and recording a plurality of phase profiles of the holographic lens 50 obtained through an optimization calculation, it is difficult to continuously connect boundaries between the partitions and the partitions, so there is a possibility that a sense of heterogeneity occurs due to a seam when observing a virtual image. In a manner that excludes the possibility of such a sense of heterogeneity, as shown in FIGS. 9 and 10, the holographic lens 50 may be formed by one recording by enlarging a virtual image of the spatial light modulator by the size of the holographic lens 50 to be recorded after placing a phase obtained through the optimization calculation directly on the spatial light modulator. The recording method of FIG. 9 is a method that may be sufficiently utilized in an augmented reality system in which a small-sized holographic lens 50 is used because the size of the holographic lens 50 that can be recorded is limited due to the laws of physics that decrease a diffraction angle when pixels of the spatial light modulator are enlarged, but may be recorded at once without sectioning.

In FIG. 9, parallel light is applied as a reference beam, and a phase profile $\phi_l$ obtained through the optimization calculation is formed by controlling the spatial light modulator.

FIG. 10 shows a recording method suitable for a case in which not only a signal beam but also a reference beam need to be compensated. In this case, a better performance may be guaranteed when the reference beam is compensated. For example, this recording method may be applied when a display apparatus to be built, for example, a virtual reality or augmented reality display apparatus, is composed of a complex optical system, and thus it is necessary to compensate not only a signal beam but also a reference beam. In an example embodiment of FIG. 10, the reference beam may be obtained by applying, for example, the same optical system as an optical system used in a display apparatus to be implemented, rather than simply applying parallel light.

As shown in FIG. 10, parallel light may be applied as the reference beam, and in order to record the holographic lens 50 having the phase profile $\phi_l$ obtained through the optimization calculation, the holographic lens 50 may be recorded by adding a phase $\phi m$ by the control of the spatial light modulator, and by adding a phase $\phi n$ instead of a simple parallel light to the reference beam.

The method of using the spatial light modulator as shown in FIGS. 8 to 10 may record an accurate phase profile.

Figure 11:
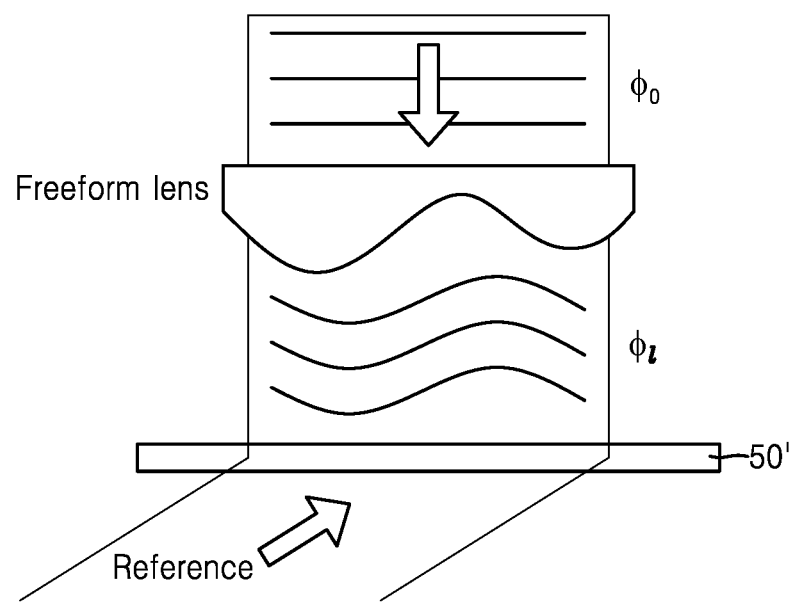

As another example, the holographic lens 50 according to an embodiment may record a phase profile in the manner of FIG. 11 in which a recording setup is more concise compared to the spatial light modulator.

FIG. 11 shows a method of recording a phase profile of the holographic lens 50 according to an embodiment using a free-form lens. FIG. 11 shows a method of recording the holographic lens 50 by applying a signal beam having the phase profile $\phi_l$ obtained through optimization calculation by making a free-form lens that forms a phase to be recorded on the holographic lens 50 and then passing parallel light $\phi_0$ through the free-form lens.

The free-form lens applied to the recording of FIG. 11 may be manufactured to have a corresponding surface using a 3D printing technology or a lens-processing device after obtaining a surface function of a lens that forms an intended phase by using an optical simulation tool.

The holographic lens 50 according to an embodiment may be applied to various optical devices such as a display apparatus. For example, a display apparatus to which the holographic lens 50 according to an embodiment is applied may be implemented as a display apparatus for augmented reality and/or virtual reality. In this case, the display apparatus for augmented reality and/or virtual reality may be implemented as a glasses type, goggles type, head mounted type, or head-up type.

Figure 12:
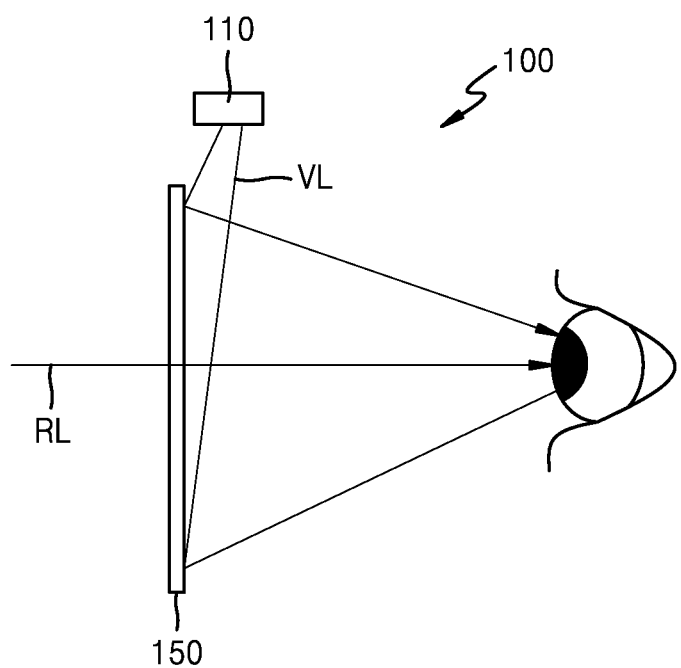
FIG. 12 is a view of a display apparatus for augmented reality to which a holographic lens according to an example embodiment is applied as a combiner.

FIG. 12 schematically shows an augmented reality display apparatus 100 to which the holographic lens 50 according to an embodiment is applied as a combiner.

Referring to FIG. 12, the augmented reality display apparatus 100 may include an image-providing device 110 and a holographic lens 150 as a combiner.

The image-providing device 110 is a unit that provides an image or an image of virtual reality, and may include a display panel or a spatial light modulator. If necessary, a reflective member for reflecting light VL representing an image of virtual reality from the image-providing device 110 and transmitting the light VL to the holographic lens 150 may be further provided between the image-providing device 110 and the holographic lens 150.

The holographic lens 150 allows the light VL representing an image of virtual reality from the image-providing device 110 to be transmitted to the user's eyes, and allows light RL representing an image of the real world to pass through the holographic lens 150 and be transmitted to the user's eyes.

The holographic lens 150 may include the holographic lens 50 according to an embodiment described with reference to FIGS. 1 to 5. In other words, the holographic lens 150 may be formed to have a phase profile obtained through an optimization process for each position to form an imaging optical system that forms a virtual image of light emitted from different pixels of the image-providing device 110.

When the augmented reality display apparatus 100 is used, an image of an augmented reality in which an image of the real world and an image of virtual reality supplied from the image-providing device 110 are superimposed may be seen in the user's eyes.

Figure 13:
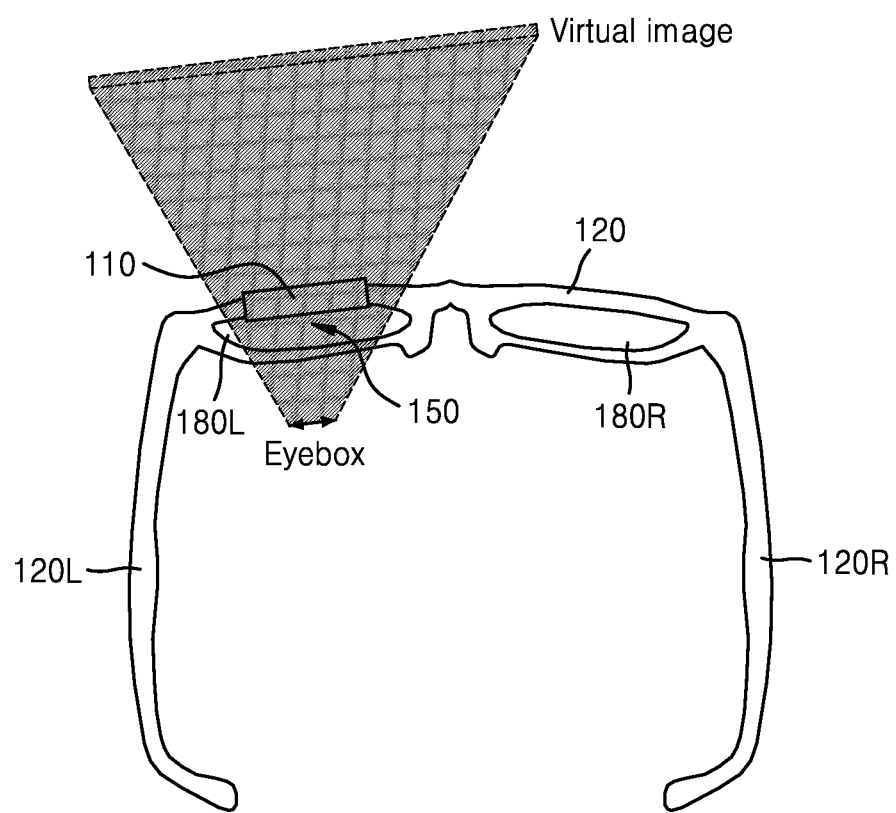
FIGS. 13 and 14 are views of an augmented reality display apparatus according to an example embodiment.
Figure 14:
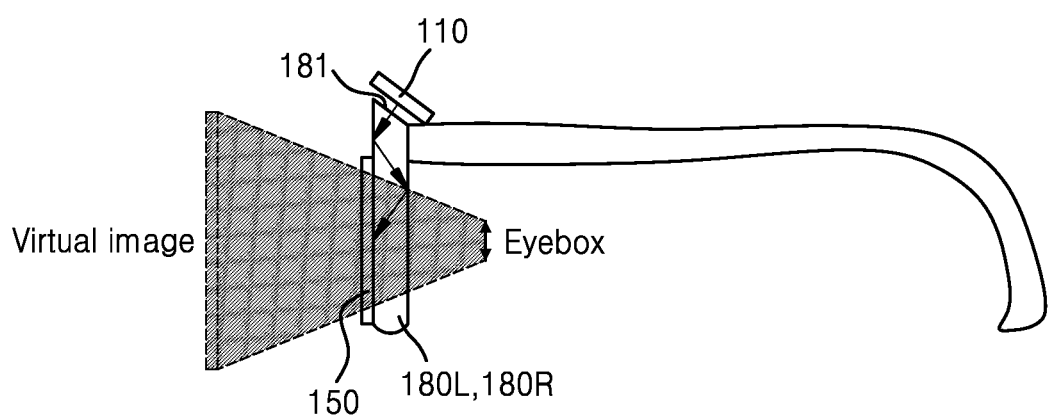

FIGS. 13 and 14 schematically show a glasses-type augmented reality display apparatus according to an example embodiment.

Referring to FIGS. 13 and 14, the glasses-type augmented reality display apparatus may include a first frame portion 120, transparent members 180L and 180R respectively mounted on left and right sides of the first frame portion 120, and the image-providing device 110. A second frame portion 120L and a third frame portion 120R are connected to both sides of the first frame portion 120, respectively. The second and third frame portions 120L and 120R are portions that are put on the user's left and right ears, respectively.

The first frame portion 120 has a shape similar to a rim in which lenses of ordinary glasses are inserted, and the transparent members 180L and 180R may be formed in a shape similar to those of the lenses of ordinary glasses. For example, the transparent members 180L and 180R may correspond to lenses of glasses.

The transparent member 180L may correspond to the user's left eye, and the transparent member 180R may correspond to the user's right eye. The transparent members 180L and 180R are areas in which an image or video of augmented reality is displayed, and may include the holographic lens 150 as a combiner on one surface. FIG. 14 shows an example in which the holographic lens 150 is on a front surface of the transparent members 180L and 180R, wherein the holographic lens 150 may be on rear surfaces of the transparent members 180L and 180R.

The image-providing device 110 may be above the transparent members 180L and 180R. The image-providing device 110 may provide an image or video of virtual reality. FIG. 13 shows that the image-providing device 110 is only above the transparent member 180L, but the image-providing device 110 may be above the transparent members 180L and 180R, respectively to express a virtual image formed by the holographic lens 150.

In other words, the image-providing device 110 may be above the transparent members 180L and 180R, respectively, and may provide an image for the left eye and an image for the right eye. The image-providing device 110 may be mounted on the first frame portion 120 to be above the transparent members 180L and 180R.

The transparent members 180L and 180R may have an incident surface 181 parallel to the image-providing device 110, and light emitted from the image-providing device 110 is incident and guided into the transparent members 180L and 180R through the incident surfaces 181 of the transparent members 180L and 180R, and may be imaged as a virtual image by the holographic lens 150.

The first frame portion 120 may have a shape capable of maximally blocking the inflow of external light through areas other than the transparent members 180L and 180R. For example, a fence may be provided to prevent the inflow of light into the first frame portion 120 around the transparent members 180L and 180R.

Because a glasses-type augmented reality display apparatus according to an example embodiment does not require a projection distance and an additional optical system by applying the holographic lens 150 forming an imaging optical system as a combiner, the holographic lens 150 is attached to one surface of the transparent members 180L and 180R serving as a light guide member, and the image-providing device 110 is mounted above the transparent members 180L and 180R, thereby securing a wide viewing angle and implementing the same or similar design as that of ordinary glasses.

The existing glasses-type augmented reality display apparatus uses a method of attaching the image-providing device 110 to the legs of the glasses by applying a combiner requiring a projection distance, and a relatively large space is required between the lenses and the eyes so that light emitted from the image-providing device 110 is not covered by the side of the user's face. This leads to an awkward design and limited viewing angle.

On the other hand, the glasses-type augmented reality display apparatus according to an example embodiment may secure a wide viewing angle by mounting the image-providing device 110 above the transparent members 180L and 180R, and may implement the same or similar design as ordinary glasses. Therefore, the glasses-type augmented reality display apparatus may be implemented with a design with high preference.

Figure 15:
FIG. 15 is a view of an example of implementing an augmented reality display apparatus according to an example embodiment as a head mounted display (HMD)
Figure 16:
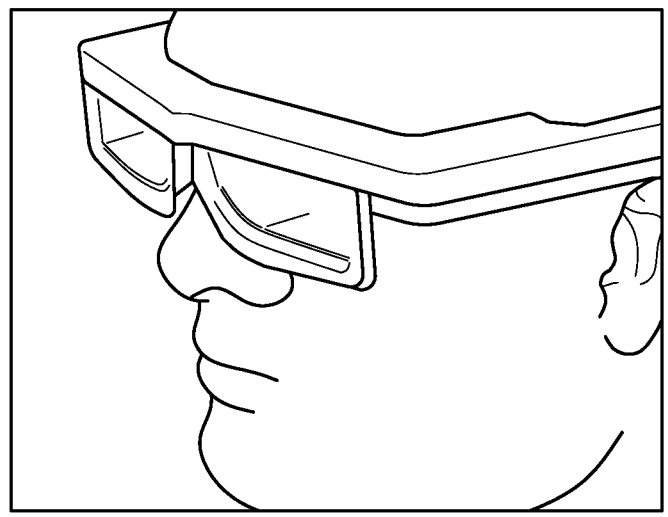
FIG. 16 is a view of an example of implementing an augmented reality display apparatus according to an example embodiment as a goggle-type display.

The augmented reality display apparatus according to an example embodiment may be implemented as a head mounted display (HMD) as shown in FIG. 15. In addition, the augmented reality display apparatus according to an example embodiment may be implemented as a goggle-type display as in FIG. 16.

Figure 17:
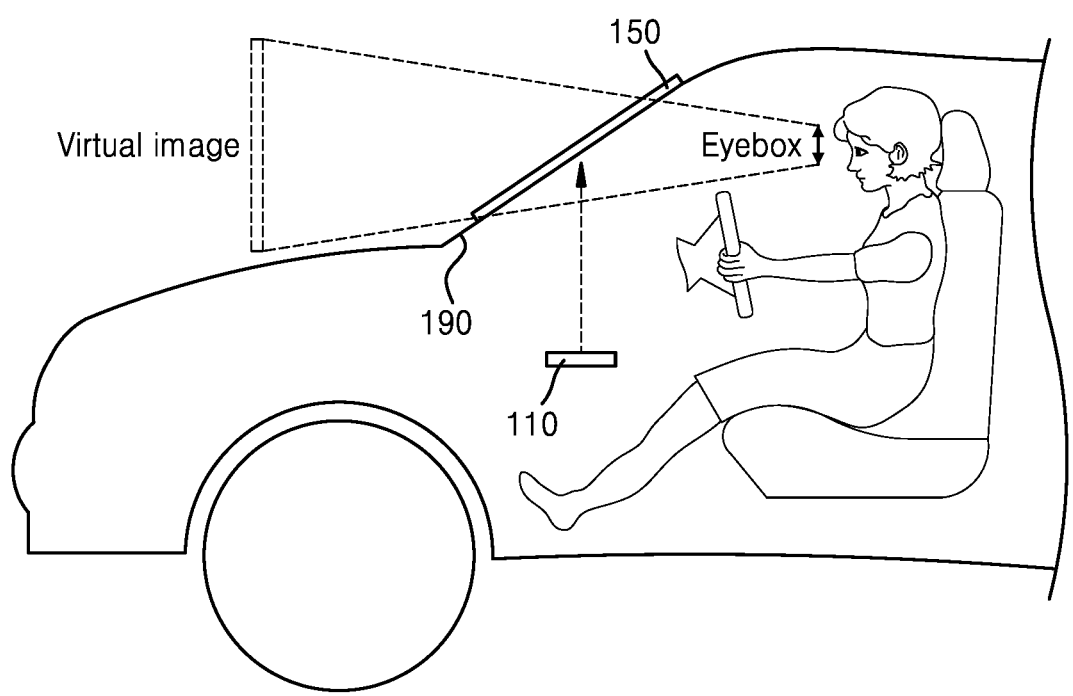
FIG. 17 is a schematic diagram when implementing an augmented reality display apparatus according to an example embodiment as a head-up display (HUD).

In addition, the augmented reality display apparatus according to an example embodiment may be implemented as a head-up display (HUD) as shown in FIG. 17.

FIG. 17 schematically shows a schematic diagram when implementing an augmented reality display apparatus according to an example embodiment as an HUD.

Referring to FIG. 17, the image-providing device 110 of the augmented reality display apparatus may be mounted at any position in a vehicle, and the holographic lens 150 may be mounted on a windshield 190 of the vehicle as a combiner to be implemented as an HUD.

In the case of an HUD, because a driver's head is not fixed, there need to be an eyebox of a certain size or larger. By applying the holographic lens 50 according to an example embodiment to the holographic lens 150, a phase profile of the holographic lens 150 for an imaging optical system may be obtained through optimization calculation, so that an eyebox of sufficient size and a wide viewing angle may be simultaneously implemented.

A holographic lens according to an example embodiment has a phase profile obtained through an optimization process for each position, and when applied as a combiner to a display apparatus, may form an imaging optical system that forms a virtual image of lights from different pixels of an image-providing device that provides an image. As a result, a virtual image may be made cleanly at an intended depth, and an eyebox of sufficient size and a wide viewing angle may be simultaneously implemented.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A holographic lens comprising:
   a plurality of positions configured to form an imaging optical system that images lights emitted from a plurality of areas of a light emitting device on a corresponding plurality of virtual image points; and
   a phase profile obtained through an optimization process for each position of the plurality of positions,
   wherein, according to the phase profile, a phase of each position of the plurality of positions in the holographic lens is formed to have an optimized value satisfying $\min\|T \cdot (\delta - \rho) - \Phi_{target}\|^2$, where ρ is a phase of light emitted from each of the plurality of areas of the light emitting device, Φ is a phase of the holographic lens, δ is a phase of light emitted from a virtual image, T is a projection matrix, and $\Phi_{target}$ is a phase providing an intended virtual image.

2. The holographic lens of claim 1, wherein, for the light emitted from each of the plurality of areas, the holographic lens is formed to have p number of phases for the each of the plurality of areas, and
   a number of the plurality of positions the phase profile of the holographic lens is smaller than a product of a number of positions of the holographic lens corresponding to the light emitted from each of the plurality of areas of the light emitting device and a number of the plurality of areas of the light emitting device.

3. The holographic lens of claim 1, wherein the holographic lens is formed to have the phase profile configured to form the virtual image on a virtual image surface corresponding to each of the plurality of areas.

4. The holographic lens of claim 1, wherein phase distribution of the holographic lens is formed to minimize an error with an ideal phase of an ideal holographic lens for an ideal imaging optical system.

5. The holographic lens of claim 1, wherein the holographic lens is formed by entirely recording the phase profile obtained through the optimization process on the holographic lens by controlling a spatial light modulator.

6. The holographic lens of claim 5, wherein the phase profile of the holographic lens is formed using a holographic printing technique in which the phase profile obtained through the optimization process is partitioned into a plurality of sections corresponding to the plurality of positions and a phase corresponding to each section is recorded by controlling the spatial light modulator.

7. The holographic lens of claim 1, wherein the phase profile of the holographic lens is formed using a free-form lens having a curve corresponding to the phase profile obtained through the optimization process.

8. A holographic lens comprising:
   a plurality of positions configured to form an imaging optical system that images lights emitted from a plurality of areas of a light emitting device on a corresponding plurality of virtual image points; and
   a phase profile obtained through an optimization process for each position of the plurality of positions,
   wherein the holographic lens is formed by entirely recording the phase profile obtained through the optimization process on the holographic lens by controlling a spatial light modulator, and
   wherein the phase profile of the holographic lens is formed by one recording by mounting the phase profile obtained through the optimization process on the spatial light modulator and expanding the phase profile by a size of the holographic lens to be recorded.

9. The holographic lens of claim 8, wherein a reference beam applied to the phase profile recording of the holographic lens is parallel light or has a phase corresponding to the lights emitted from the plurality of areas.

10. A display apparatus comprising:
an image-providing device configured to provide an image; and
a combiner configured to combine the image emitted from the image-providing device and an external foreground,
wherein the combiner comprises:
a holographic lens having a plurality of positions configured to form an imaging optical system that images lights emitted from a plurality of pixels of the image providing device on a corresponding plurality of virtual image points; and
a phase profile obtained through an optimization process for each position of the plurality of positions,
wherein, according to the phase profile, a phase of each position of the plurality of positions of the holographic lens is formed to have an optimized value satisfying $$\min\|T\cdot(\delta-\rho)-\varphi_{target}\|^2,$$

where p is a phase of light emitted from each pixel among the plurality of pixels of the image-providing device, $\Phi$ is a phase of the holographic lens, $\delta$ is a phase of light emitted from a virtual image, T is a projection matrix, and $\Phi_{target}$ is a phase providing an intended virtual image.

11. The display apparatus of claim 10, wherein, for the light emitted from each of the plurality of pixels of the image-providing device, the holographic lens is formed to have p number of phases for the each of the plurality of pixels, and
a number of positions of the phase profile of the holographic lens is smaller than a product of a number of positions of the holographic lens corresponding to the light emitted from each pixel of the image-providing device and a number of pixels of the image-providing device.

12. The display apparatus of claim 10, wherein the holographic lens has the phase profile configured to form the image on a virtual image surface corresponding to each of the plurality of pixels of the image-providing device.

13. The display apparatus of claim 10, wherein phase distribution of the holographic lens is formed to minimize an error with an ideal phase of an ideal holographic lens for an ideal imaging optical system.

14. The display apparatus of claim 10, wherein the holographic lens is formed by entirely recording the phase profile obtained through the optimization process on the holographic lens by controlling a spatial light modulator.

15. The display apparatus of claim 14, wherein the phase profile of the holographic lens is formed using a holographic printing technique in which the phase profile obtained through the optimization process is partitioned into a plurality of sections corresponding to the plurality of positions and a phase corresponding to each section is recorded by controlling the spatial light modulator.

16. The display apparatus of claim 14, wherein the phase profile of the holographic lens is formed by one recording by mounting the phase profile obtained through the optimization process on the spatial light modulator and expanding the phase profile by the size of the holographic lens to be recorded.

17. The display apparatus of claim 14, wherein a reference beam applied to the phase profile recording of the holographic lens is parallel light or has a phase corresponding to the lights emitted from pixels of the image-providing device.

18. The display apparatus of claim 10, wherein the phase profile of the holographic lens is formed using a free-form lens having a curve corresponding to the phase profile obtained through the optimization process.

19. The display apparatus of claim 10, wherein the display apparatus is an augmented reality (AR) display apparatus of a head mounted type, glasses type, goggles type, or head-up type.

20. The display apparatus of claim 10, further comprising:
a transparent member having an incident surface parallel to the image-providing device,
wherein the holographic lens is provided on one surface of the transparent member.

21. The display apparatus of claim 20, wherein the display apparatus is a glasses type display apparatus, and
wherein the transparent member is a lens of the glasses type display apparatus.

22. The display apparatus of claim 21, wherein the image-providing device is provided above the transparent member.

23. The display apparatus of claim 20, wherein the image-providing device is provided above the transparent member.

24. The display apparatus of claim 23, wherein the display apparatus is an augmented reality (AR) display apparatus of a head mounted type, glasses type, goggles type, or head-up type.

* * * * *